(12) United States Patent
Bielesch et al.

(10) Patent No.: US 11,682,948 B2
(45) Date of Patent: Jun. 20, 2023

(54) CONTROL DEVICE FOR CONTROLLING AN ELECTRIC MOTOR COMPRISING A PLATE PENETRATED BY AN ELECTRONIC POWER COMPONENT

(71) Applicant: Mahle International GmbH, Stuttgart (DE)

(72) Inventors: Thomas Bielesch, Muehlacker (DE); Michael Boehm, Kanagawa-Ken (JP); Andrej Rul, Stuttgart (DE); Wojciech Stasch, Stuttgart (DE); Stefan Wehle, Stuttgart (DE); Benjamin Weimann, Stuttgart (DE)

(73) Assignee: Mahle International GmbH

( * ) Notice: Subject to any disclaimer, the term of this patent is extended or adjusted under 35 U.S.C. 154(b) by 249 days.

(21) Appl. No.: 16/961,695

(22) PCT Filed: Dec. 17, 2018

(86) PCT No.: PCT/EP2018/085307
§ 371 (c)(1),
(2) Date: Jul. 12, 2020

(87) PCT Pub. No.: WO2019/137748
PCT Pub. Date: Jul. 18, 2019

(65) Prior Publication Data
US 2021/0135548 A1    May 6, 2021

(30) Foreign Application Priority Data
Jan. 12, 2018  (DE) .................... 10 2018 200 480.3

(51) Int. Cl.
*H02K 5/18* (2006.01)
*H02K 5/20* (2006.01)
(Continued)

(52) U.S. Cl.
CPC ............ *H02K 11/33* (2016.01); *H02K 5/18* (2013.01); *H02K 5/207* (2021.01); *H02K 5/225* (2013.01);
(Continued)

(58) Field of Classification Search
CPC ............ H02K 5/18; H02K 5/20; H02K 5/203; H02K 5/207; H02K 5/225; H02K 9/06;
(Continued)

(56) References Cited

U.S. PATENT DOCUMENTS 6,175,171 B1 * 1/2001 Rupp ..................... H02K 5/18
                                                    310/68 R
6,268,669 B1   7/2001 Wakao et al.
(Continued)

FOREIGN PATENT DOCUMENTS

CN      201781691 U  *  3/2011
CN      201781691 U     3/2011
(Continued)

OTHER PUBLICATIONS

Xiao et al., Machine Translation of CN201781691, Mar. 2011 (Year: 2011).*
(Continued)

*Primary Examiner* — Eric Johnson
(74) *Attorney, Agent, or Firm* — Fishman Stewart PLLC

(57) ABSTRACT

A control device for controlling an electric motor of an electrical device may include a flat plate and a power electronics. The plate may extend in a plate plane. The power electronics may include a plurality of electronic components arranged and interconnected on the plate. The power electronics may have at least one electronic power component that produces waste heat during operation. The at least one electronic power component may be arranged such that a body of the at least one electronic power component
(Continued)

penetrates the plate plane. A plurality of power connections, via which the at least one electronic power component may be interconnected to the plurality of electronic components, may be arranged at an edge of the plate.

24 Claims, 4 Drawing Sheets

(51) Int. Cl.
| | |
|---|---|
| H02K 5/22 | (2006.01) |
| H02K 9/06 | (2006.01) |
| H02K 9/22 | (2006.01) |
| H02K 11/33 | (2016.01) |
| H02K 7/00 | (2006.01) |

(52) U.S. Cl.
CPC ............... *H02K 7/003* (2013.01); *H02K 9/06* (2013.01); *H02K 9/227* (2021.01)

(58) Field of Classification Search
CPC .......... H02K 9/22; H02K 9/223; H02K 9/227; H02K 11/30; H02K 11/33
See application file for complete search history.

(56) References Cited

U.S. PATENT DOCUMENTS

| | | | |
|---|---|---|---|
| 6,297,572 B1 | 10/2001 | Sunaga et al. | |
| 7,939,978 B2 | 5/2011 | Best et al. | |
| 9,590,323 B2 | 3/2017 | Winheim et al. | |
| 2003/0194327 A1* | 10/2003 | Bradbury | F04D 29/384 417/423.1 |
| 2006/0152907 A1* | 7/2006 | Rathmann | H02K 11/33 361/720 |
| 2010/0284838 A1* | 11/2010 | Ichise | H02K 11/33 417/410.1 |
| 2014/0175914 A1 | 6/2014 | Zeng et al. | |
| 2015/0077955 A1* | 3/2015 | Tio | H05K 7/1432 361/752 |
| 2015/0216083 A1* | 7/2015 | Kanazawa | H02K 11/33 361/717 |
| 2015/0326093 A1 | 11/2015 | Olsen et al. | |
| 2016/0087511 A1* | 3/2016 | De Filippis | H05K 7/209 310/68 D |
| 2016/0238031 A1 | 8/2016 | Clothier et al. | |
| 2017/0008554 A1* | 1/2017 | Hirotani | H02K 11/33 |
| 2018/0069487 A1* | 3/2018 | Hattori | F04B 39/121 |
| 2019/0386547 A1* | 12/2019 | Im | H02M 7/003 |

FOREIGN PATENT DOCUMENTS

| | | |
|---|---|---|
| CN | 104145406 A | 11/2014 |
| CN | 204720313 U | 10/2015 |
| CN | 105247765 A | 1/2016 |
| DE | 94 15 934 U1 | 11/1994 |
| DE | 20 2007 019 072 U1 | 5/2010 |
| DE | 10 2011 112 821 A | 3/2013 |
| EP | 1 079 502 A1 | 2/2001 |
| EP | 3 082 245 A1 | 10/2016 |
| WO | WO-2014/102 068 | 7/2014 |
| WO | WO-2014/191 893 | 12/2014 |
| WO | WO-2016152312 A1 * | 9/2016 ............. F04B 35/04 |

OTHER PUBLICATIONS

Chinese Office Action dated Dec. 16, 2021 for copending Chinese App. No. 201880085986.3 (with English translation).

Chinese Search Report dated Dec. 6, 2021 for copending Chinese App. No. 2018800859863 (with English translation).

* cited by examiner

CONTROL DEVICE FOR CONTROLLING AN ELECTRIC MOTOR COMPRISING A PLATE PENETRATED BY AN ELECTRONIC POWER COMPONENT

CROSS-REFERENCE TO RELATED APPLICATIONS

This application claims priority to International Patent Application No. PCT/EP2018/085307, filed on Dec. 17, 2018, and German Application No. DE 10 2018 200 480.3, filed on Jan. 12, 2018, the contents of both of which are hereby incorporated by reference in their entirety.

TECHNICAL FIELD

The present invention relates to a control device. The invention moreover relates to an electrical device and to a conveying device comprising a control device of this type.

BACKGROUND

Electronic components, such as, e.g. coils or capacitors, which are usually arranged on a plate, are used in control devices. The electronic components, in particular power components, such as capacitors, inductors and transistors, heat up as a result of the operation of the control device. This heat has to be dissipated in order to prevent damages to or a premature wear of, respectively, the electronic components. Even though there are heat-resistant components, such as, e.g., shunts or capacitors, which are designed for the operation at temperatures of max. 150° Celsius to max. 170° Celsius, or also windings of electric motors of up to max. 200° C., it is possible that the emitted heat of these components additionally heats up and thus damages adjacent heat-sensitive components, such as, e.g., widespread MOS-FET. Electronic components are usually arranged in a housing. To cool the components, it can be provided that the components are thermally connected to a portion of the housing, in order to dissipate the heat emitted by the components and to thus cool the components. Power components of this type are usually further larger than, for example, control components. To cover a plate equipped with power components of this type, the housing has to provide a corresponding, relatively high installation space.

An electric motor comprising a control device is known from WO 2014/191893 A2, wherein the control device has a flat plate, which has, on its front side, cylindrical power components, which are equipped as capacitors and which are arranged at the plate on the edge side in such a way that a longitudinal central axis of the respective component runs parallel to the plane of the plate. On the edge side, the plate is moreover provided with recesses, into which the components dip in such a way that they stick out from the plate on the front side and on the rear side of the plate and protrude beyond the edge of the plate. A portion of the housing of the electric motor is moreover designed as cooling structure, wherein the power components are coupled to said cooling structure so as to transfer heat.

An electric motor comprising an integrated cooling fan is known from US 2014/0 175 914 A1.

A turbine fan comprising integrated electric motor and control device is known from US 2016/0 238 031 A1, wherein an airflow generated by the fan is guided within the housing such that it is used to cool the electrical components.

A fluid pump, which has an electric motor for driving a pump wheel, is known from US 2015/0 326 093 A1. The pump wheel is arranged in a pump housing. The electric motor is arranged in a motor housing. A control device for operating the electric motor is arranged in a control housing. The motor housing connects the pump housing to the control housing.

SUMMARY

The present invention thus deals with the problem of specifying an improved or at least alternative embodiment for a control device, which is in particular characterized in that the heat dissipation can be simplified and/or the thermal stress can be reduced and/or the required installation space can be designed in a flatter manner.

This problem is solved according to the invention by the subject matter of the independent claim(s). Advantageous embodiments are subject matter of the dependent claim(s).

The present invention is based on the general idea of providing a control device comprising a power electronics having at least one electrical power component, in the case of which the respective power component is arranged such that the power component penetrates a plate plane with its body. In other words: The plate plane intersects the power component. A flat plate extends in the plate plane, wherein the power electronics is formed of several electronic components, which are arranged on the plate and which are interconnected. Power connections, via which the respective power component is interconnected to the other components of the power electronics, are arranged at the plate, e.g. at an edge of the plate. Due to the proposed arrangement of the respective power component, the respective power component no longer sticks out upwards or downwards from the plate perpendicular to the plate plane in its entire dimension. As a result, the power component can be connected to the plate in an installation space-saving manner. This results in a flatter installation space for the plate or in a lower overall height of the housing, respectively, in which the plate is arranged. The installation space required for the plate or for the housing, respectively, can thus at least be reduced or can be designed in a flatter manner, respectively. The respective power component is, e.g., a capacitor, an inductor or a power transistor or a semiconductor component or any other current-conducting component in the circuit of the plate. The control device is formed to control an electric motor of an electrical device.

A possible embodiment proposes that the respective power component is arranged laterally next to the plate. In addition or in the alternative, the power connections can be arranged at an exterior edge of the plate, which surrounds the plate as a whole.

Housing walls of the housing, in which the plate is arranged, can be formed as heat sink. For this purpose, the housing is made, for example, of a metal, preferably of a light metal, such as, e.g., an aluminum alloy. The arrangement of the respective power component laterally next to the plate provides for a better thermal connection of the respective power component to the housing walls. For example, the respective power component can thus be connected to the housing walls on several sides. It is conceivable that the respective power component can be thermally connected to the housing walls, e.g. from the top and bottom and optionally also laterally. A heat emission of the respective power component to other heat-sensitive components arranged on the plate can furthermore at least be reduced by the lateral arrangement of the power component. The construction area of the plate is not necessarily increased by the lateral arrangement, because the construction area of the plate can be formed to be smaller, because the respective power component is no longer arranged on the plate, but next to the plate on the edge side.

A further possible embodiment proposes that the plate has at least one plate opening, which penetrates the plate, and that the respective power component is arranged in the plate opening. In other words: The respective power component is arranged in an aperture of the plate. In addition or in the alternative, the power connections can be arranged at an interior edge of the plate, wherein the interior edge surrounds the plate opening. The power connections are thus located in the vicinity of the respective power component, whereby the power connections can contact the respective power component more easily. It is possible that the plate opening is thereby formed complementary to the respective power component. This construction can also be used to reduce the overall height of the plate or the overall height of the housing, respectively, in which the plate is arranged.

The respective plate opening is preferably designed completely within the plate, so that it is enclosed completely by the plate and has a closed circumferential opening edge.

An embodiment, in the case of which the respective power component dips into the respective plate opening to the extent that a central area of the power component is arranged at the height of the plate or of the plate plane, respectively, is particularly advantageous. The central area of the respective power component extends, for example, over a middle third of a diameter of the power component, which is measured perpendicular to the plate plane. An upper area adjacent to the central area on the upper side of the plate, and a lower area adjacent to the central area on the bottom side of the plate, then in each case likewise extend over an upper or lower third, respectively, of said diameter. The respective power component advantageously has a cylindrical, preferably circular cylindrical, body, and has a longitudinal central axis, which runs parallel to the plate plane.

An embodiment, in the case of which at least two power components are provided, which have different cross sections or different diameters perpendicular to the plate plane, respectively, and which are in particular inserted into separate plate openings in such a way that the longitudinal central axis of the one power component is located above the plate, while the longitudinal central axis of the other power component is located below the plate, is particularly advantageous. It can in particular further be provided that the at least two power components stick out from the plate essentially with the same distance on a side of the plate. The wording "essentially with the same distance" is to allow deviations of maximally 10%. The respective power component advantageously has a cylindrical, preferably circular cylindrical, body, and has a longitudinal central axis, which runs parallel to the plate plane.

In further design of the invention, it can be provided that a cross section of the body of the respective power component perpendicular to the plate plane is larger than a thickness of the plate. A better thermal connection of the body of the respective power component to the housing walls is thus made possible, because the body of the respective power component sticks out from the plate or from the plate plane, respectively.

It can preferably further be provided that the body of the respective power component sticks out from the plate perpendicular to the plate plane on both sides of the plate. The assembled plate is thus of a comparatively flat construction.

It is thus also possible to thermally connect the body of the respective power component to the housing walls from the top and from the bottom. It is therefore possible to improve the dissipation of the heat created during the operation of the respective power component or to provide for a better cooling of the respective power component, respectively.

It can advantageously further be provided that the plate is divided into a high-voltage area and a low-voltage area, wherein the components of the power electronics in the high-voltage area and the electronic components of a control electronics for controlling the power electronics are arranged in the low-voltage area. If the plate is divided into a high-voltage area and a low-voltage area, this is advantageous, because it is thus possible to arrange the components of the power electronics and the components of the control electronics on the plate separated from one another. It is thus further possible to apply different voltages to different areas of the plate, wherein a relatively low voltage, e.g. approximately 12 Volt, is present in the low-voltage area, and a voltage, which is high or higher relative thereto, respectively, e.g. approximately 48 Volt, is present in the high-voltage area. It is thus possible to arrange components, which are designed for the operation at lower voltage, as well as components, which are designed for the operation at higher voltage, on the plate. In this way, the plate can, for example, be prepared or designed, respectively, for a dual electrical system of a motor vehicle.

The electrical system of a motor vehicle includes all electrical components of the vehicle, such as, e.g. control devices, sensors, battery systems, and display elements, for example displays and warning lights. Due to constantly evolving comfort systems, such as, e.g., better air conditioning systems or displays for consumer electronics arranged in the vehicle, the electrical system of a modern vehicle is subjected to ever-increasing stresses. In particular in the winter at low temperatures, the electrical system is subjected to an increased stress even without comfort systems. Electrical systems with relatively low voltage, e.g. 12 Volt, which can also be referred to as low voltage in the present context, or with a slightly higher voltage, e.g. 48 Volt, which can also be referred to as high voltage in the present context, are generally known. A dual electrical system operates with two different voltages, thus with the lower voltage as well as with the higher voltage, or, in other words, the dual electrical system operates with low voltage and with high voltage. In the present context, the high voltage is not a high voltage, which, by definition, is at least 1,000 Volt, but generally lies below 100 Volt, preferably at approx. 48 Volt.

According to a further advantageous embodiment, it can be provided that the plate moreover has a coupling area, which adjoins the power area on the one hand and the control area on the other hand. At least one electrical coupling component is arranged in the coupling area, wherein the power electronics and the control electronics are coupled to one another via the respective electrical coupling component. This is advantageous, because it is thus made possible that the power electronics and the control electronics can exchange signals with one another.

A further possible embodiment proposes that the respective coupling component is formed to generate a galvanically separated coupling of power electronics and control electronics. It is advantageous that the electrical potential of the power electronics and the electrical potential of the control electronics are galvanically separated from one another. For this purpose, the electrical line between the control electronics and the power electronics is interrupted by the respective coupling component, which is electrically non-conductive. It is conceivable to use an optocoupler as coupling component for coupling the control electronics to the power electronics. An optocoupler makes it possible to exchange signals between the control electronics and the power electronics, even though the control electronics is galvanically separated from the power electronics. An optocoupler has a transmitting component and a receiver component, which are optically coupled to one another for signal transmission. Capacitive and inductive couplers are further known, which can be used as coupling component. It is also possible that the respective coupling component is a transformer, which transmits signals between the control electronics and the power electronics.

It can generally be provided that an electrical device, has, e.g., a conveying device, for conveying a fluid, a housing, and an electric motor arranged in the housing or at the housing. The electric motor can thereby be controlled by means of a control device of the above-described type, which is likewise arranged in the housing or at the housing.

In a further advantageous design of the invention, it can be provided that the plate is arranged in the housing such that the respective power component is connected to the housing so as to transfer heat. This is advantageous, because, depending on how strongly the respective power component heats up during operation, additional cooling elements can be forgone, whereby the plate can be produced more cost-efficiently. To provide for a high heat dissipation through the housing, it is conceivable that the housing is made of metal. To provide for an even better heat dissipation, it is additionally conceivable that the housing has copper elements. The housing can have one or several housing walls, which are made of a heat-insulating material, preferably of a heat-insulating plastic. It is advantageous thereby that the respective housing wall, which is made of a heat-insulating material, faces an outer heat source, whereby a heat-up of the heat-sensitive components by means of an external heat source is at least reduced. The plate is therefore arranged in the housing such that at least one thermally conductive housing wall dissipates the heat of the plate, and at least one other thermally insulating housing wall at least reduces a heating of the plate by means of an external heat source.

It can advantageously further be provided that, for the respective power component, the housing has a component receptacle with the installation space, into which the respective power component is inserted. The component receptacle of the housing is formed complementary to the body of the respective power component. If the housing has a component receptacle for the respective power component, this is advantageous, because the heat-transferring connecting surface, by means of which the respective power component is connected to the housing, can be increased by means of the component receptacle, whereby an improved heat dissipation through the housing is made possible. It is advantageous that the housing is curved to the outside at the component receptacle of the respective power component. It is further advantageous that the respective power component is arranged in a stable manner in the housing by means of the component receptacle.

A further advantageous embodiment provides that the housing has cooling fins on an outer side, which faces away from the respective power component. This is advantageous, because the surface area, with which the respective power component is connected to the housing so as transfer heat, is increased in this way. To further improve the cooling of the respective power component, it is conceivable that a coolant or air flows against the cooling fins, whereby the heat absorbed by the cooling fins can be dissipated from the cooling fins more efficiently.

A further advantageous embodiment proposes that a fluid flow of the conveying device can flow against the housing on the outer side, which faces away from the respective power component. If the respective power component is connected to the housing so as to transfer heat, the housing and/or the cooling fins arranged at the housing heat up due to the heat, which is emitted by the respective power component. It is therefore advantageous when a fluid flow of the conveying device can flow against the housing because the heat absorbed by the housing thereby can be dissipated efficiently by means of the fluid flow. The fluid flow of the conveying device serves as a type of coolant, which can flow against the outer side of the housing and/or the cooling fins. This is advantageous, because an additional coolant for cooling the housing and/or the cooling fins can thus be forgone.

According to a further advantageous embodiment, it can be provided that the electrical device has an opening, which penetrates the housing and the plate, wherein at least a portion of the fluid flow of the conveying device can flow through the opening. The opening is further penetrated by a shaft, which is driveably connected to the conveying device.

In a preferred embodiment, the housing can have a thermally insulating separating wall, which extends between the respective power component and the plate, wherein the separating wall crosses the plate plane perpendicularly and is arranged between the power connections. The separating wall is made of a heat-insulating material, preferably of a plastic. If the respective power component is arranged laterally next to the plate, it is thus conceivable that the separating wall is likewise arranged laterally next to the plate. If the plate has a plate opening, in which the respective power component is arranged, it is thus possible that the plate has a further opening, in which the separating wall is arranged. It is likewise possible that the separating wall is arranged laterally next to the respective power component in the plate opening. The separating wall thereby at least partially absorbs the heat, which is emitted by the respective power component. This is advantageous, because a heat-up of the remainder of the plate can at least be reduced by the heat emitted from the respective power component. It is conceivable that a protrusion of the housing is formed as thermally insulating separating wall. It is necessary thereby that this protrusion is made of a heat-insulating material. It is also conceivable that the separating wall is formed as screw-on bolt comprising a cylindrical internal thread. The screw-on bolt is screwed to the housing from the outer side of the housing. The cylindrical internal thread portion acts as separating wall and is made of a thermally insulating material, and encloses the respective power component.

According to an advantageous embodiment, it can be provided that the respective power component is embedded in a casting compound. The casting compound fixes the respective power component to the housing. The casting compound has a dampening effect, wherein the casting compound thus forms a type of protective layer for the respective power component, whereby the risk of damages to the respective power component due to shocks is at least reduced. The heat-transferring properties of the casting compound further make it possible to efficiently dissipate heat. Due to the dampening effect of the casting compound, the stress on the brittle, sensitive soldered joints of the plate is greatly reduced.

It is conceivable that the high-voltage area or the low-voltage area, respectively, are at least partially limited by the internal edge and/or by the external edge of the plate. The control electronics formed from the components arranged in the control area is coupled to the power electronics, which is formed from the respective power component. It is possible that the control electronics is coupled to the power electronics by means of a coupling component, which is formed to couple the control electronics to the power electronics in a galvanically separated manner.

It can generally be provided that a conveying device for conveying a fluid has an electrical device of the above-described type, and a conveyor wheel, which is driven by means of an electric motor, for driving the fluid. The fluid can thereby be used as coolant for cooling the plate. The fluid can flow, e.g., against the outer sides of the areas of the housing, in which the component receptacles of the respective power component are arranged, and can cool the housing or the respective power component, respectively, in this way.

In further design of the invention, it can be provided that the conveying device is a charging device for a fresh air system of an internal combustion engine or a water pump for a cooling circuit or a compressor for a refrigerant circuit or a fan for a heating device or a cooling device or a fuel or oil pump for an internal combustion engine. In the case of an electrical exhaust gas turbocharger, the air to be compressed can act as heat sink. The coolant, which is to be conveyed, of an electrical water pump or the coolant, which is to be conveyed, of an electrical air conditioning compressor, respectively, can likewise serve for the purpose of cooling the plate. If the conveying device is a fan, e.g. a fan motor for cooling a heat exchanger of a motor cooling circuit, the air, which is conveyed through the fan motor, serves as heat sink for cooling the plate. In the case of a fuel pump, the fuel can be used to cool the plate.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
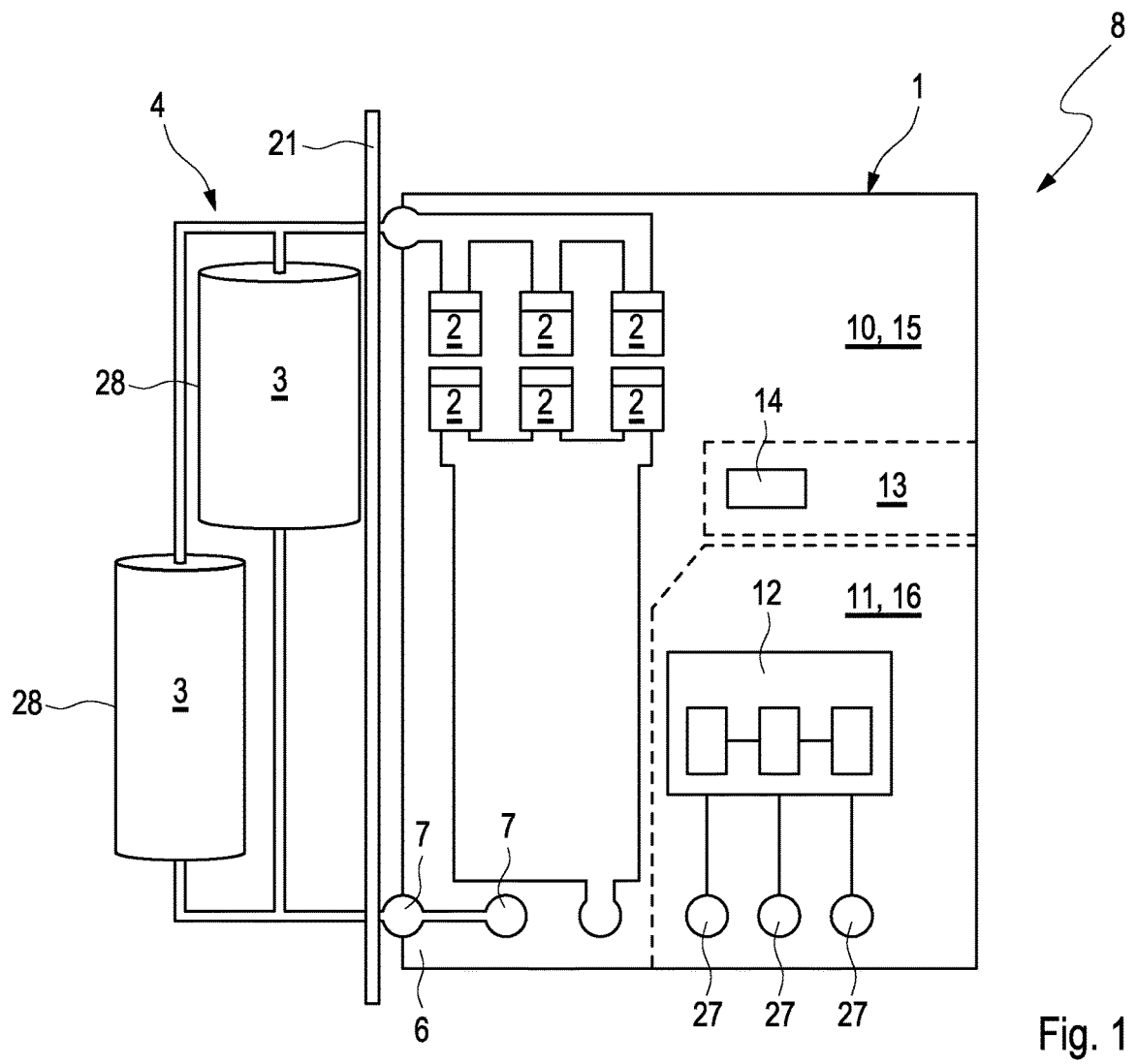
FIG. 1 shows a highly simplified top view onto a plate comprising power components arranged laterally next to the plate.

According to FIG. 1, a flat plate 1 has several electronic components 2, which are arranged and interconnected on the plate 1. Two power components 3, which form a power electronics 4, are arranged laterally next to the plate 1. The plate 1 thereby acts as carrier for all electronic components 2 and serves for the mechanical fastening as well as for the electrical connection of these components 2. The power components 3 are likewise electrically connected to the plate. The two electrical power components 3 are thereby arranged next to the plate 1 such that they penetrate a plate plane 5, which is only illustrated in FIGS. 2 and 4, with their body 28.

The number of the components 2 or of the power components 3, respectively, illustrated in FIGS. 1 to 5 is to thereby be understood in an exemplary manner. It does not leave the scope of the present invention, when more or fewer components 2 or more or fewer power components 3, respectively, are connected to the plate 1.

As illustrated in FIG. 1, power connections 7, via which the two power components 3 can be contacted, are arranged at an external edge 6 of the plate 1. The control electronics 12 can thereby be controlled via control connections 27. A separating wall 21 extends between the power components 3 and the plate 1 (see FIGS. 1 and 2). The separating wall 21 crosses the plate plane 5 perpendicularly and is formed in a thermally insulating manner, in order to prevent that other areas of the plate 1 are heated up by the heat emitted by the power components 3.

According to FIG. 1, the plate 1 can be divided into a high-voltage area 10 and a low-voltage area 11, wherein the power electronics 4 is arranged in the high-voltage area 10, and the control electronics 12 is arranged in the low-voltage area 11. A coupling component 14, which is formed to couple the power electronics 4 and the control electronics 12 to one another, is arranged in a coupling area 13. The coupling component 14 can further be formed to galvanically separate the power electronics 4 and the control electronics 12 from one another. It goes without saying that it is possible that more than one coupling component 14 is arranged in the coupling area 13. The coupling area 13 adjoins a power area 15 on the one hand and a control area 16 on the other hand, wherein the power electronics 4 is arranged in the power area 15, and the control electronic 12 is arranged in the control area 16.

Figure 2:
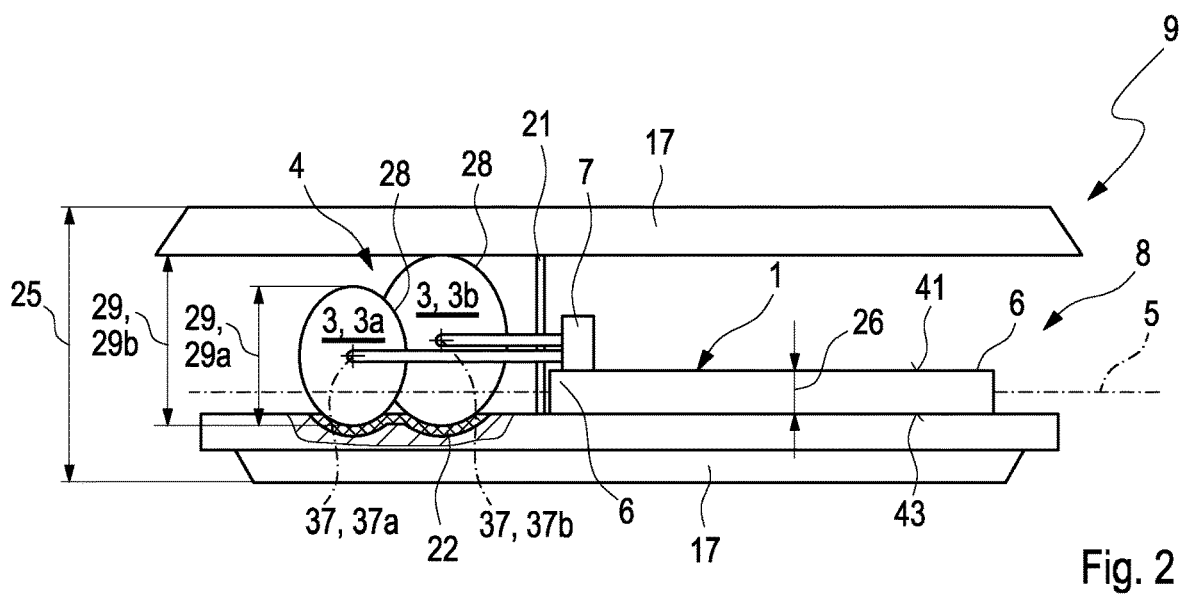
FIG. 2 shows a highly simplified side view of the plate comprising power components arranged laterally next to the plate.

FIG. 2 illustrates in an exemplary manner, how the two power components 3, which are arranged next to the plate 1, penetrate the plate plane 5 with their body 28. A housing 17, in which the plate 1 and the power component 3 are arranged, thus has a lower overall height 25 than if the power components 3 were arranged on the plate 1. Viewed perpendicularly to the plate plane 5, the cross section or diameter 29 of the body 28 of the power components 3 is thereby larger than a thickness 26 of the plate 1. The bodies 28 of the two power components 3 thus stick out from the plate 1 perpendicularly to the plate plane 5 on both sides.

Figure 3:
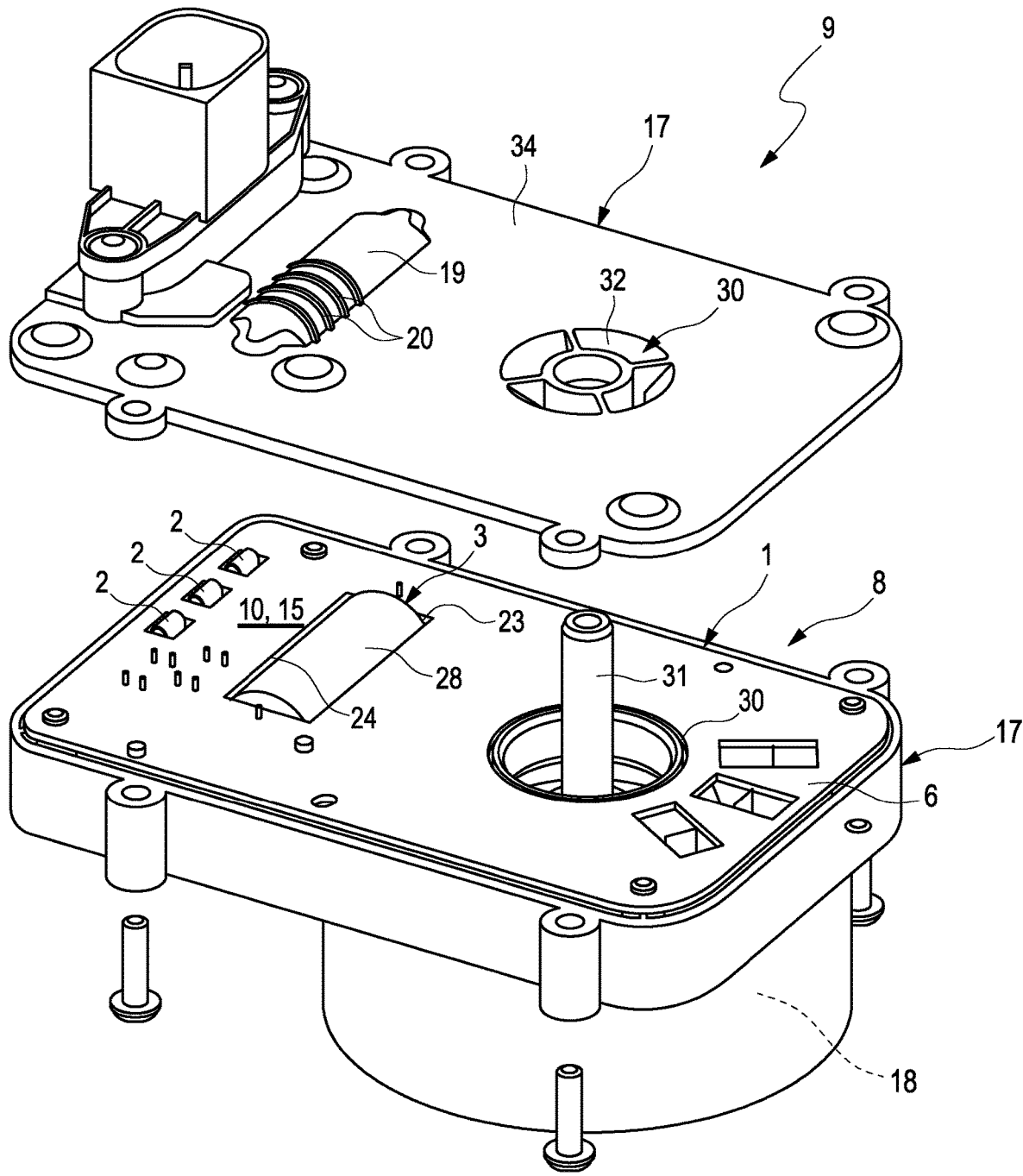
FIG. 3 shows a three-dimensional exploded drawing of a conveying device comprising a power component arranged in a plate opening.
Figure 4:
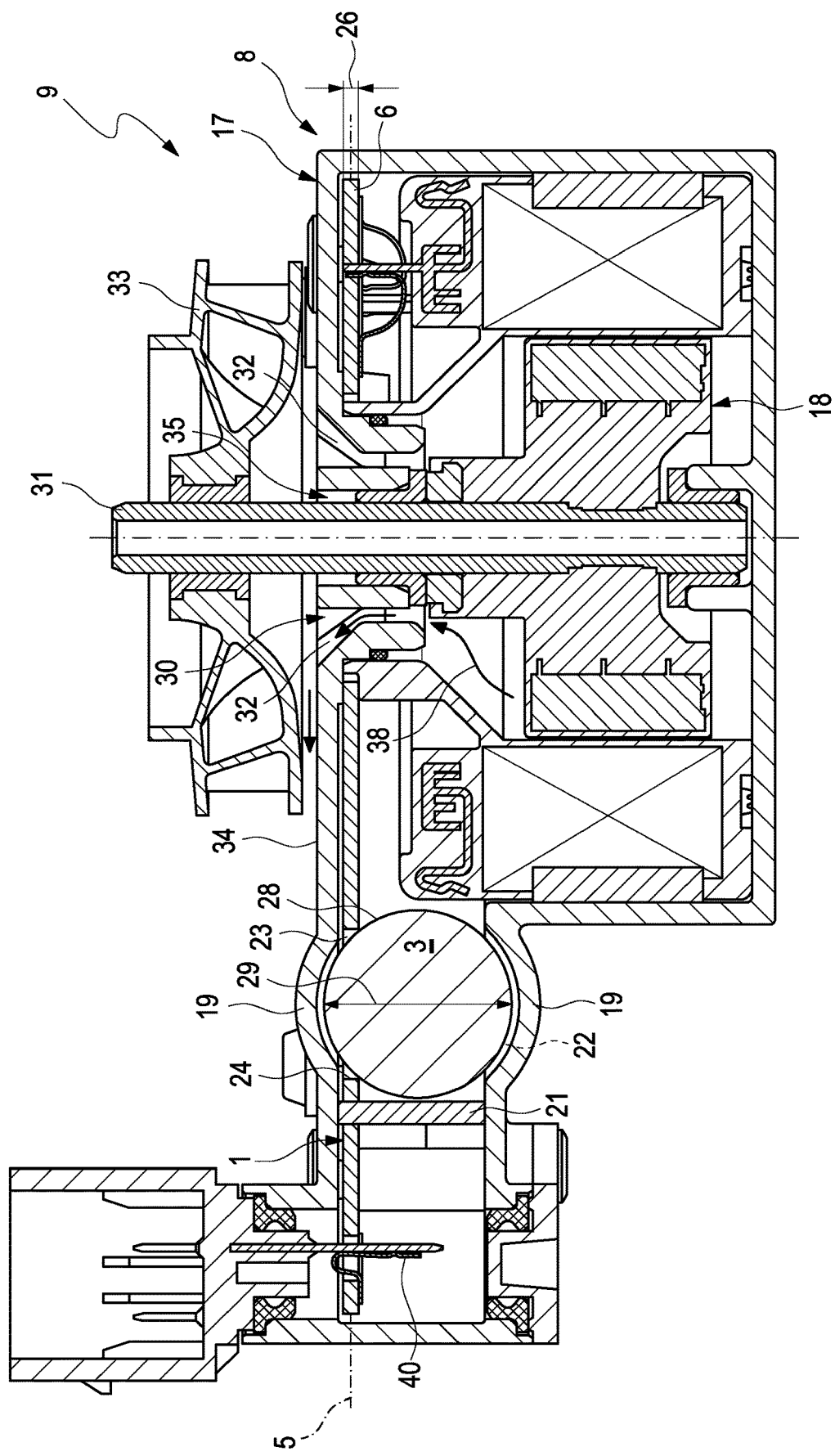
FIG. 4 shows a side view onto the conveying device, comprising a power component arranged in the plate opening.

According to FIGS. 3 and 4, a conveying device 9 for conveying a fluid has a control device 8 comprising a plate 1 for controlling an electric motor 18. Within the conveying device 9, the electric motor 18 drives a conveyor wheel or impeller 33 with its shaft 31. The rotating impeller 33 drives a fluid and thus generates a fluid flow. A housing of the conveying device 9 forms the above-mentioned housing 17 for receiving the plate 1 or the control device 8, respectively.

Figure 5:
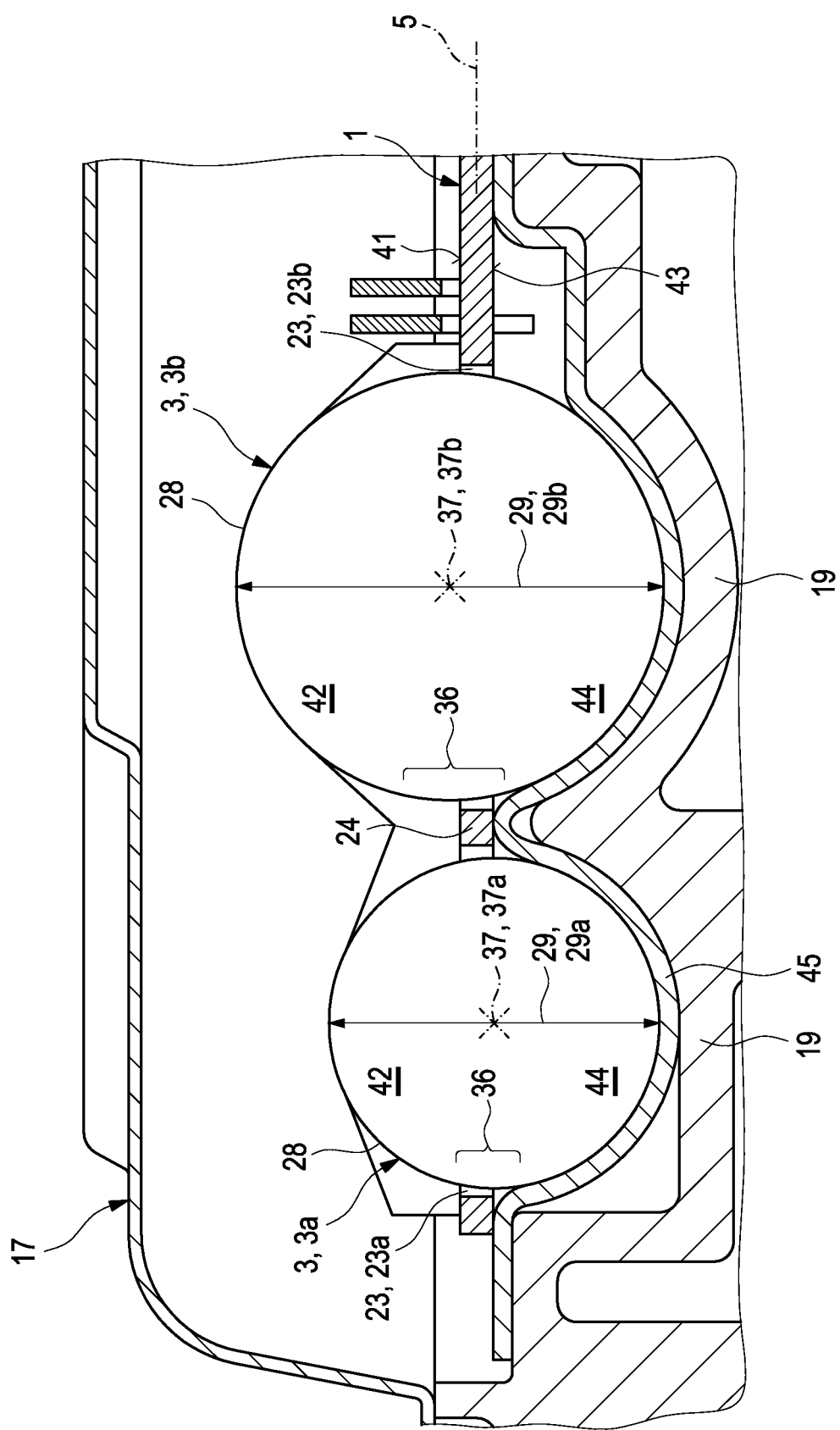
FIG. 5 shows a highly simplified side view of the plate, as in FIG. 2, but in the case of power components, which are inserted into the plate openings.

The plate 1 can be arranged in the housing 17 such that the respective power component 3 is connected to the housing 17 so as to transfer heat. As illustrated in FIGS. 3 to 5, the housing 17 can have a component receptacle 19, into which the power component 3 is inserted, whereby the heat transfer from the power component 3 to the housing 17 can be improved, because the heat transfer surface is increased by the component receptacle 19. The component receptacle 19 is thereby formed complementary to the body 28 of the power component 3, whereby in particular a particularly large-area contact can be created. In FIGS. 3 and 4, the housing 17 has only one component receptacle 19 for one power component 3, whereby it goes without saying that it does not leave the scope of the present invention, when more than one component receptacle 19 for more than one power component 3 are formed at the housing 17. FIG. 5 therefore shows an example comprising two power components 3 and two separate component receptacles 19.

Cooling fins 20 can be arranged at the outer side of the housing 17, which faces away from the power component 3 (see FIG. 3). The cooling fins 20 likewise serve the purpose of increasing the surface area, through which the heat, which is produced during the operation of the power component 3, can be dissipated.

According to FIGS. 3 to 5, the respective power component 3 is arranged in a plate opening 23. As illustrated in FIG. 4, the separating wall 21 can also cross the plate 1. In addition to the plate opening 23, the plate 1 has, for this purpose, a further opening 39, in which the separating wall 21 is arranged. This further opening 39 can also be referred to below as wall opening 39. It is also conceivable that the separating wall 21 is arranged in the plate opening 23 together with the power component 3. The separating wall 21 is arranged between the power component 3 and power connections 40 of the plate 1 and at least partially absorbs the heat emitted by the power component 3 and can dissipate it to the housing 17.

As illustrated in FIGS. 3 and 4, the electrical device, thus the conveying device 9 here 9, can have an opening 30, which penetrates the housing 17 and the plate 1, and which can hereinafter also be referred to as fluid opening 30. At least a portion of the fluid flow of the conveying device 9 can flow through this fluid opening 30. For this purpose, a duct structure 32 can be provided and can in particular be integrated into the housing 17. This duct structure 32 can dissipate a portion of the fluid flow to the electric motor 18 or from the electric motor 18, respectively, in order to cool the latter. In the example, the duct structure 32 penetrates the fluid opening 30 of the plate 1.

The fluid opening 30 can further be penetrated by the shaft 31 of the electric motor 18, which can be driven by means of the conveying device 9. In the example, the shaft 31 moreover penetrates the above-mentioned duct structure 32, in particular concentrically. In this case, the duct structure 32 simultaneously forms a bearing point 35 for the shaft 31 or the rotor of the electric motor 18, respectively.

It can be seen that the conveyor wheel 33 is arranged on the outside of the housing 17. The housing 17 further contains a cooling path 38, which leads at least partially through the electric motor 18. The cooling path 38 is suggested by flow arrows in FIG. 4. It is clear that the housing 17 has inlet openings, which are not shown here, for the respective fluid, through which the fluid can flow into the housing 17. In the housing 17, the fluid follows the cooling path 38 and can flow out of the housing 17 again through the fluid opening 30 and can entrain heat from the electric motor 18 thereby. At least a portion of the fluid flow generated during the operation of the conveying device 9 by means of the conveyor wheel 33 therefor flows through the cooling path 38.

It is further conceivable that a fluid flow of the conveying device 9 can flow against the housing 17 on the outer side 34, which faces away from the respective power component 3, in order to also effect a cooling here. In FIG. 4, said outer side 34 faces the impeller 33.

As illustrated in FIG. 2 and as suggested in FIG. 4, the power component 3 can be embedded in a casting compound 22 in the component receptacle 19, whereby the power component 3 can moreover be fixed in the component receptacle 19 by means of the casting compound 22. The power component 3 is connected to the housing 17 so as to transfer heat by means of the casting compound 22. For this purpose, a casting compound 22 is selected, which is characterized by an increased coefficient of thermal conductivity.

In FIGS. 3 to 5, the power connections 7 of the respective power component 3 are arranged at an internal edge 24 of the plate 1 in an exemplary manner, whereby the power component 3 is located in the plate opening 23. The plate opening 23 is thereby enclosed by the internal edge 24. In FIGS. 1 and 2, the power connections 7 of the two power components are arranged at the external edge 6 in an exemplary manner, whereby the power components 3 are located laterally next to the plate 1.

The embodiment shown in FIG. 5, in the case of which the respective power component 3 is arranged at the plate 1 such that a central area 36 of the respective power component 3 is arranged at the height of the plate 1 or of the plate plane 5, respectively, is particularly advantageous. In detail, the respective power component 3 dips into the respective plate opening 23 to the extent here that the central area 36 of the power component 3 is arranged at the height of the plate 1 or of the plate plane 5, respectively. The central area 36 of the respective power component 3 extends, for example, over a middle third of a diameter 29 of the power component 3, which is measured perpendicular to the plate plane 5. An upper area 42 adjacent to the central area 36 on the upper side 41 of the plate 1, and a lower area 44 adjacent to the central area 36 on the bottom side 43 of the plate 1, then in each case likewise extend over an upper or lower third, respectively, of said diameter 29. The respective power component 3 advantageously has a cylindrical, preferably circular cylindrical, body 28, and has a longitudinal central axis 37, which runs parallel to the plate plane 5 and which is perpendicular to the drawing plane 5 in FIGS. 2 and 5

The embodiments shown in FIGS. 2 and 5, in the case of which at least two power components 3a and 3b are provided, which have different cross sections 29a, 29b or different diameters 29a, 29b, respectively, are particularly advantageous. In FIG. 5, the at least two power components 3a, 3b are moreover inserted into separate plate openings 23a, 23b. In FIG. 5, the two power components 3a, 3b are arranged or are inserted into the separate plate openings 23a, 23b, respectively, such that the longitudinal central axis 37a of the power component 3a on the left in FIG. 5 is located below the plate plane 5, while the longitudinal central axis 37b of the power component 3b on the right in FIG. 5 is located above the plate plane 5.

According to FIGS. 2 and 5, the arrangement of the power components 3a, 3b can further take place such that the at least two power components 3a, 3b stick out from the plate 1 essentially with the same distance on a side of the plate 1, here on the bottom side 43. The wording "essentially with the same distance" is to allow deviations of maximally 10%. The respective power component 3a, 3b advantageously also has a cylindrical, preferably circular cylindrical, body 28, and has a longitudinal central axis 37, which runs parallel to the plate plane 5.

In FIG. 5, a heat coupling layer 45, which improves the heat coupling between the respective power component 3 and the housing 17, is shown instead of a casting compound 22. This heat coupling layer 45 can be a coating or an inserted film or the like.

The invention claimed is:

1. A control device for controlling an electric motor of an electrical device, comprising:
   a flat plate extending in a plate plane;
   a power electronics including a plurality of electronic components arranged and interconnected on the plate;
   the power electronics having at least one electronic power component that produces waste heat during operation;
   the plate including at least one plate opening penetrating the plate, the at least one plate opening disposed completely within the plate such that the at least one plate opening has a closed circumferential edge;
   the at least one electronic power component having a main body arranged in the at least one plate opening such that the main body of the at least one electronic power component penetrates the plate plane;
   wherein a plurality of power connections, via which the at least one electronic power component is interconnected to the plurality of electronic components, are arranged at an edge of the plate;
   wherein the at least one electronic power component includes at least two power components having different diameters perpendicular to the plate plane; and
   wherein the at least two power components are arranged such that a longitudinal central axis of one of the at least two power components is disposed below the plate and a longitudinal central axis of the other of the at least two power components is disposed above the plate.

2. The control device according to claim 1, wherein:
   the plurality of power connections are arranged at an interior edge of the plate; and
   the interior edge defines the closed circumferential edge of the at least one plate opening.

3. The control device according to claim 1, wherein, perpendicular to the plate plane, a diameter of the main body of at least one of the at least two electronic power components is larger than a thickness of the plate.

4. The control device according to claim 1, wherein the main body of at least one of the at least two electronic power components projects out from the plate perpendicular to the plate plane on both sides of the plate.

5. The control device according to claim 1, wherein:
   the main body of at least one of the at least two electronic power components is a cylindrical main body; and
   a central area of the cylindrical main body, which extends over a middle third of a diameter of the cylindrical main body, is arranged at a height of the plate.

6. The control device according to claim 1, wherein the at least two power components project out from the plate a same distance on a side of the plate.

7. The control device according to claim 1, wherein:
   the plate includes a high-voltage area and a low-voltage area;
   the at least two electronic power components are arranged in the high-voltage area; and
   a plurality of electronic components of a control electronics configured to control the power electronics are arranged in the low-voltage area.

8. The control device according to claim 7, wherein:
   the plate further includes a coupling area adjoining the high-voltage area on one side and adjoining the low-voltage area on another side; and
   the power electronics and the control electronics are coupled to one another via at least one electrical coupling component arranged in the coupling area.

9. The control device according to claim 8, wherein the at least one electrical coupling component is configured to provide a galvanically separated coupling of the power electronics and the control electronics.

10. An electrical device, comprising:
    a housing;
    an electric motor arranged in the housing; and
    the control device according to claim 1 arranged in the housing.

11. The electrical device according to claim 10, wherein the plate is arranged in the housing such that at least one of the at least two electronic power components is connected to the housing to facilitate a transfer of heat.

12. The electrical device according to claim 10, wherein the housing has a component receptacle structured complementary to the main body of at least one of the at least two electronic power components and into which the at least one of the at least two electronic power components is inserted.

13. The electrical device according to claim 10, wherein the housing includes at least one of:
    a plurality of cooling fins disposed on an outer side facing away from at least one of the at least two electronic power components; and
    an elevation disposed in an area of at least one of the at least two electronic power components.

14. The electrical device according to claim 10, wherein the housing is structured and arranged such that, during operation, a fluid flow flows against the housing on an outer side facing away from at least one of the at least two electronic power components.

15. The electrical device according to claim 14, wherein the plate includes an opening through which at least a portion of the fluid flow is flowable.

16. The electrical device according to claim 10, wherein the housing includes a duct structure for guiding a portion of a fluid flow, wherein the plate includes an opening penetrated by the duct structure of the housing.

17. The electrical device according to claim 16, further comprising a drivable shaft, wherein:
    the opening of the plate is penetrated by the shaft; and
    the duct structure of the housing is penetrated by the shaft and forms a bearing point for the shaft within the opening of the plate.

18. The electrical device according to claim 10, wherein the housing includes a thermally insulating separating wall that crosses the plate plane and that is arranged between the plurality of power connections and at least one of the at least two electronic power components.

19. The electrical device according to claim 10, wherein at least one of the at least two electronic power components is embedded in a casting compound fixing the at least one of the at least two electronic power components to the housing.

20. A conveying device, comprising:
    the electrical device according to claim 10; and
    a conveyor wheel configured to drive a fluid and that is drivable via the electric motor.

21. The conveying device according to claim 20, wherein:
the conveyor wheel is arranged on an outside of the housing;
the housing includes a cooling path extending at least partially through the electric motor; and
at least a portion of a fluid flow provided via the conveyor wheel flows through the cooling path.

22. The conveying device according to claim 20, wherein the conveying device is configured as one of:
a charging device for a fresh air system of an internal combustion engine;
a water pump for a cooling circuit;
a compressor for a refrigerant circuit;
one of a fan and a ventilator for one of a heating device and a cooling device;
a fuel pump for an internal combustion engine; and
an oil pump for an internal combustion engine.

23. A control device for controlling an electric motor of an electrical device, comprising:
a flat plate extending in a plate plane;
a power electronics including a plurality of electronic components arranged and interconnected on the plate;
the power electronics having at least one electronic power component that produces waste heat during operation;
the at least one electronic power component arranged such that a body of the at least one electronic power component penetrates the plate plane;
wherein a plurality of power connections, via which the at least one electronic power component is interconnected to the plurality of electronic components, are arranged at an edge of the plate;
wherein the at least one electronic power component includes at least two power components having different diameters perpendicular to the plate plane; and
wherein the at least two power components are arranged such that a longitudinal central axis of one of the at least two power components is disposed below the plate and a longitudinal central axis of the other of the at least two power components is disposed above the plate.

24. A control device for controlling an electric motor of an electrical device, comprising:
a flat plate extending in a plate plane;
a power electronics including a plurality of electronic components arranged and interconnected on the plate;
the power electronics having at least one electronic power component that produces waste heat during operation;
the at least one electronic power component arranged such that a body of the at least one electronic power component penetrates the plate plane;
wherein a plurality of power connections, via which the at least one electronic power component is interconnected to the plurality of electronic components, are arranged at an edge of the plate;
wherein the plate includes a high-voltage area and a low-voltage area;
wherein the at least one electronic power component is arranged in the high-voltage area;
wherein a plurality of electronic components of a control electronics configured to control the power electronics are arranged in the low-voltage area;
wherein the at least one electronic power component includes at least two power components having different diameters perpendicular to the plate plane; and
wherein the at least two power components are arranged such that a longitudinal central axis of one of the at least two power components is disposed below the plate and a longitudinal central axis of the other of the at least two power components is disposed above the plate.

* * * * *